(12) United States Patent
Matarasso

(10) Patent No.: US 7,641,960 B2
(45) Date of Patent: Jan. 5, 2010

(54) CELLULAR CUSHIONED MATERIAL

(75) Inventor: Hasdi Matarasso, Netanya (IL)

(73) Assignee: Green Magic Wrap Packaging Solutions, Ltd., Zur Ygal (IL)

( * ) Notice: Subject to any disclaimer, the term of this patent is extended or adjusted under 35 U.S.C. 154(b) by 612 days.

(21) Appl. No.: 10/516,838

(22) PCT Filed: Jun. 4, 2003

(86) PCT No.: PCT/IL03/00476

§ 371 (c)(1),
(2), (4) Date: May 23, 2005

(87) PCT Pub. No.: WO03/103929

PCT Pub. Date: Dec. 18, 2003

(65) Prior Publication Data

US 2005/0202212 A1    Sep. 15, 2005

Related U.S. Application Data

(60) Provisional application No. 60/385,607, filed on Jun. 5, 2002.

(51) Int. Cl.
*B32B 3/12* (2006.01)
*B65D 30/00* (2006.01)
*B65D 81/03* (2006.01)

(52) U.S. Cl. ........................ 428/166; 428/178; 428/188; 383/3; 229/87.02; 229/87.03; 206/522; 206/814

(58) Field of Classification Search ................. 428/166, 428/178, 188; 383/3; 229/87.02, 87.03; 206/522, 814
See application file for complete search history.

(56) References Cited

U.S. PATENT DOCUMENTS

| 2,633,442 | A | * | 3/1953 | Caldwell | ..................... 156/210 |
| 4,096,306 | A | | 6/1978 | Larson | |
| 6,209,286 | B1 | | 4/2001 | Perkins et al. | |
| 2002/0094393 | A1 | * | 7/2002 | Matarasso | ................... 428/34.1 |

FOREIGN PATENT DOCUMENTS

| DE | 3801041 A | 7/1989 |
| FR | 1392961 A | 3/1965 |
| WO | WO 02/018211 A2 | 7/2002 |
| WO | WO 02/055293 A2 | 7/2002 |

* cited by examiner

*Primary Examiner*—Donald Loney
(74) *Attorney, Agent, or Firm*—Davidson, Davidson & Kappel, LLC

(57) ABSTRACT

An inflatable cellular cushioning material having an air inlet pipe path to be inflated by an inflating device through the use of an air inlet pipe, the inflatable cushioning material comprising at least two layers of plastic pre-welded in such a manner so as to form a substantially diagonally oriented lines forming sleeves along the longitudinal axis of the inflatable cellular cushioning material and a substantially horizontal welded lines along the path of the air inlet pipe whereby the horizontal welded lines substantially reduce the non-inflated areas along the path of the air inlet pipe.

10 Claims, 5 Drawing Sheets

CELLULAR CUSHIONED MATERIAL

PRIORITY APPLICATION

The present application claims priority from U.S. application 60/385,607 titled DEVICE AND METHOD FOR THE PRODUCTION OF CELLULAR CUSHIONED MATERIAL filed on Jun. 5, 2002.

BACKGROUND OF THE INVENTION

1. Field of the Invention

The present invention generally relates to an improved cellular cushioned material and to an improved pre-welded cellular cushioned material and a method for making the same in particular.

2. Discussion of the Related Art

Cellular cushioning material is used for packing and for the filling of empty volumes. U.S. patent application Ser. No. 09/758,544, publication Ser. No. 2002/0094393A1, U.S. Pat. No. 6,682,622 filed by Matarasso discloses a pre-welded cellular cushioning material and method, the method includes providing a pre-welded sheet to a user comprised of at least two layers of plastic pre-welded to have a plurality of diagonally oriented, inflatable sleeves extending substantially the entire width of said sheet, and a longitudinally extending air entry passage. According to Matarasso each of the inflatable sleeves has an opening for allowing entry of air from said air entry passage into the sleeve. The user inflates the cellular cushioning material using an air injecting pipe located in the center of the sheet inflated, the pipe is inserted into the mid section of the plastic sheet using a knife for cutting a passageway in the middle or side section of the inflatable plastic sheet.

According to Matarasso each of the sleeves is welded from all sides except for a small opening. Once air is injected into the diagonal sleeves a horizontal welding is applied to the plastic sheet. The horizontal welding is applied to the inflated plastic sheet at predetermined intervals. The welding is applied using horizontal bars. Each weld determines the production rate of the cellular cushioning material. Due to openings between the pre-welded sections entire areas juxtaposed to the air inlet pipe are not sealed from all of their sides causing a significant reduction in the efficiency of the partially inflated plastic sheet.

Reference is now made to FIG. 1 which shows a plastic sheet having a plurality of diagonally oriented, inflatable sleeves extending substantially the entire width of the shown sheet, known in the art. Once diagonal sleeves 100, 101, 102 are air filled, horizontal weld 104 is made using horizontal welding bars, thus creating non-inflated area 108. Like non-inflated areas are located throughout the length of the air filling section of the plastic sheet. The longer the distance between horizontal welds 104, 106 the larger the non-inflated section that is created within the plastic sheet.

It is therefore an object of the present invention to provide a pre-welded cellular cushioning material having a minimal non-inflated section.

It is also an object of the present invention to provide an additional longitudinal weld during the process of welding thus minimizing the non-inflated section during the production of the inflated cellular cushioning material.

SUMMARY OF THE PRESENT INVENTION

In accordance with the above objects, the present invention provides a pre-welded cellular cushioning material.

According to one aspect of the present invention there is provided an inflatable cellular cushioning material having an air inlet pipe path to be inflated by an inflating device through the use of an air inlet pipe, the inflatable cushioning material comprising two or more layers of plastic pre-welded in such a manner so as to form a substantially diagonally oriented lines forming sleeves or cell structure along the longitudinal axis of the inflatable cellular cushioning material and a substantially longitudinal welded lines along the path of the air inlet pipe, the longitudinal welded lines have non-welded longitudinal line areas to allow for the inflating of the sleeves or sell structure, whereby the longitudinal welded lines substantially reduce the non-inflated areas along the path of the air inlet pipe. The longitudinal welded lines are pre-welded before the plastic sheet is inflated by the inflating device or are welded after the sleeves have been inflated. Alternatively, the longitudinal welded lines are welded using an L shaped plastic sealing bars having longitudinal and horizontal arms. The horizontal arm has the length of the distance between a first and a second longitudinal welding performed by the L shaped plastic sealing. The diagonally oriented lines can have an obtuse angle in respect of the longitudinal welds. Alternatively, the diagonally oriented lines can have an acute angle in respect of the longitudinal welds. The horizontal weld is applied about every 1 to 20 centimeter along the longitudinal axis of the plastic sheet. The non-welded areas are located about every 5 to 30 centimeter along the longitudinal axis of the inflatable cellular cushioning material. The non-welded areas measure about 0.3 to 3 centimeters.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

A cellular cushioning material having a plurality of diagonally oriented, inflatable sleeves and a horizontal weld is disclosed.

The present invention overcomes the disadvantages of the prior art by providing cellular cushioning material having diagonally oriented inflatable sleeves with a longitudinal weld, either pre-welded or welded during the process of manufacture. The longitudinal weld is placed along the path of the air inlet pipe. Thus, the present invention improves the cellular cushioning material substantially reducing the non-inflatable areas.

Figure 1:
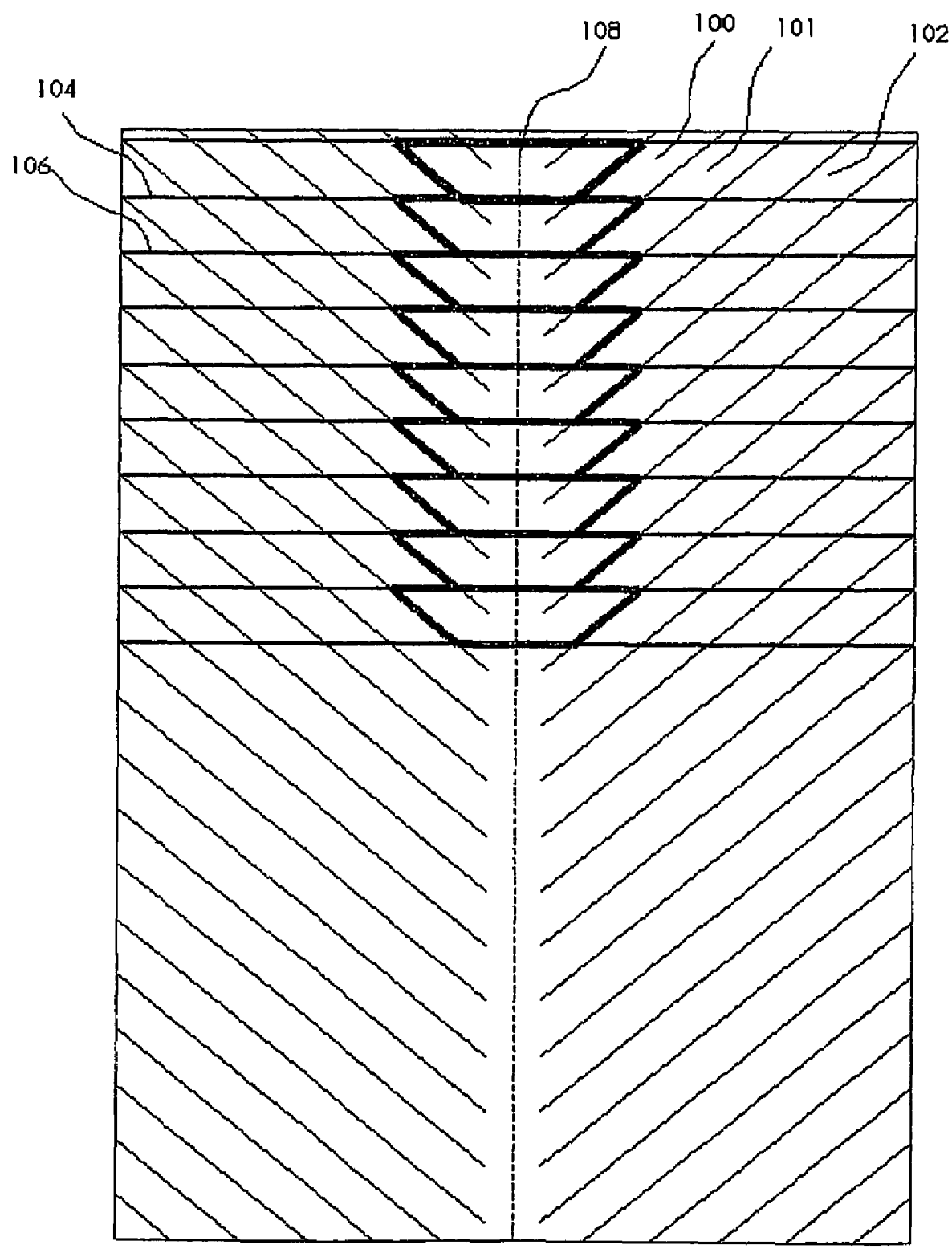
FIG. 1 is a cellular cushioning material having a plurality of diagonally oriented, inflatable sleeves extending substantially the entire width of the shown sheet, known in the art.
Figure 2:
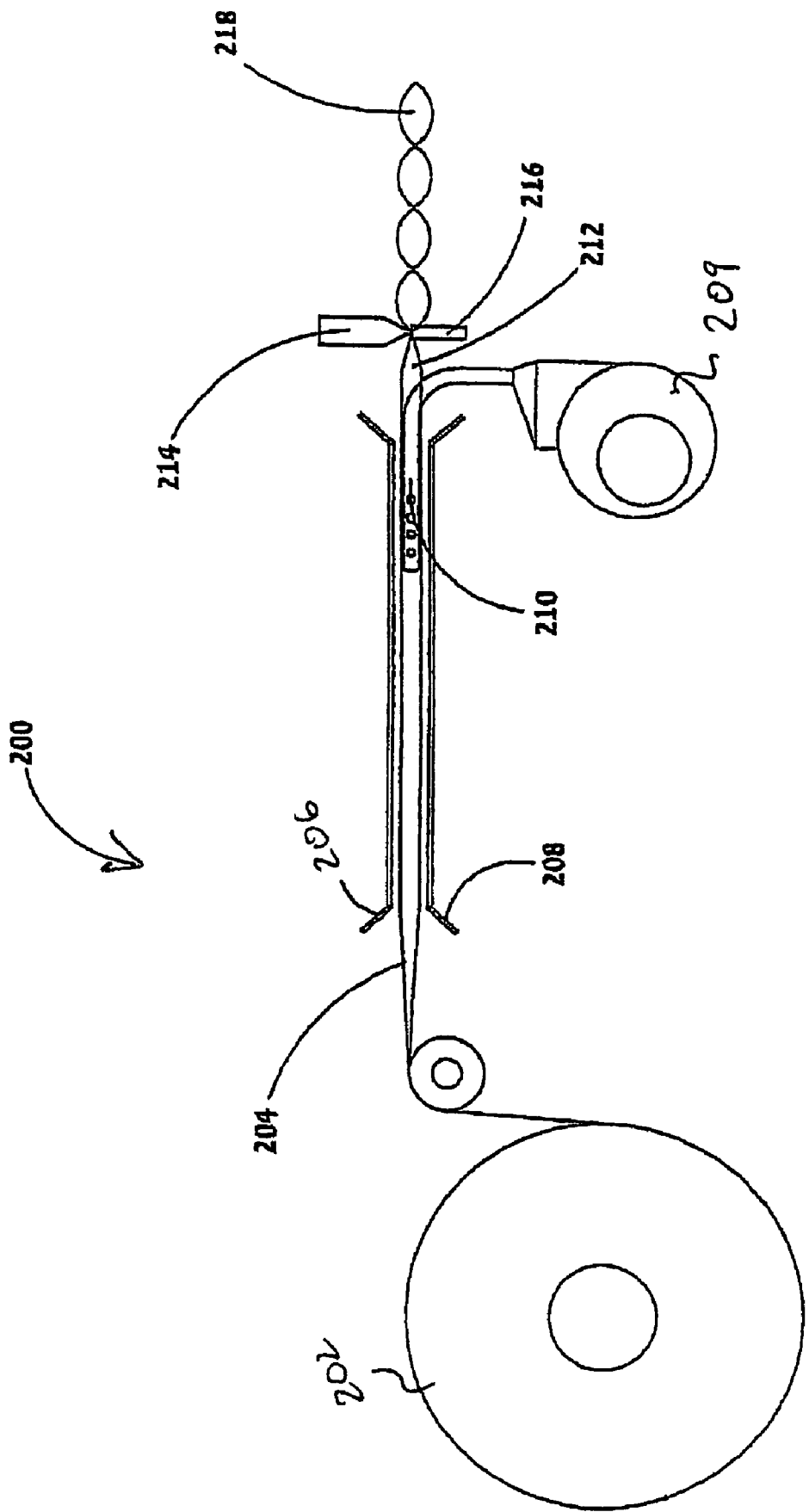
FIG. 2 is a side view of a device for manufacturing of the cellular cushioning material, in accordance with the present invention.

The device for manufacturing of the cellular cushioning material in accordance with the present invention is shown in FIG. 2. Device 200 can be used for manufacturing of the cellular cushioning material in accordance with the present invention. Device 200 can be a portable device through which plastic material is fed to create the cellular cushioning material. Any type of plastic or polymer based material can be used in association with the device 200 for manufacturing of the cellular cushioning material. Pre-welded dispensing roll 202 feeds continuous pre-welded plastic sheet 204 through flat plates 206, 208. The pre-welded plastic sheet comprises two layers of plastic or two bi-layer sheets of plastic. In the preferred embodiment, the outer two layers of the plastic sheet are made of thick plastic film resistant to such a degree so it will not melt during the welding process and the inner two layers are made of thinner plastic sheets which would weld together upon the application of heat and the welding bars. Air inlet pipe 210 is connected via an air conduit to air blower 209 or other air or gas supplying device. Air inlet pipe 210 is inserted via a knife (not shown) or other tearing device between the top and the bottom inner layers of the plastic sheet. Air is injected through the air inlet pipe into the plastic sheet thus inflating the diagonally pre-welded sleeves. The plastic sheet now inflated 212 is welded using horizontal bars 214, 216 applying pressure and heat to the inflated plastic sheet, thus providing a welded and inflated cellular cushioning material 218. Other embodiments of apparatuses that can be used are apparatuses depicted in co-filed PCT application titled INFLATABLE CELLULAR CUSHIONING MATERIAL HAVING A BRICK LIKE FORMATION by Matarasso.

Figure 3:
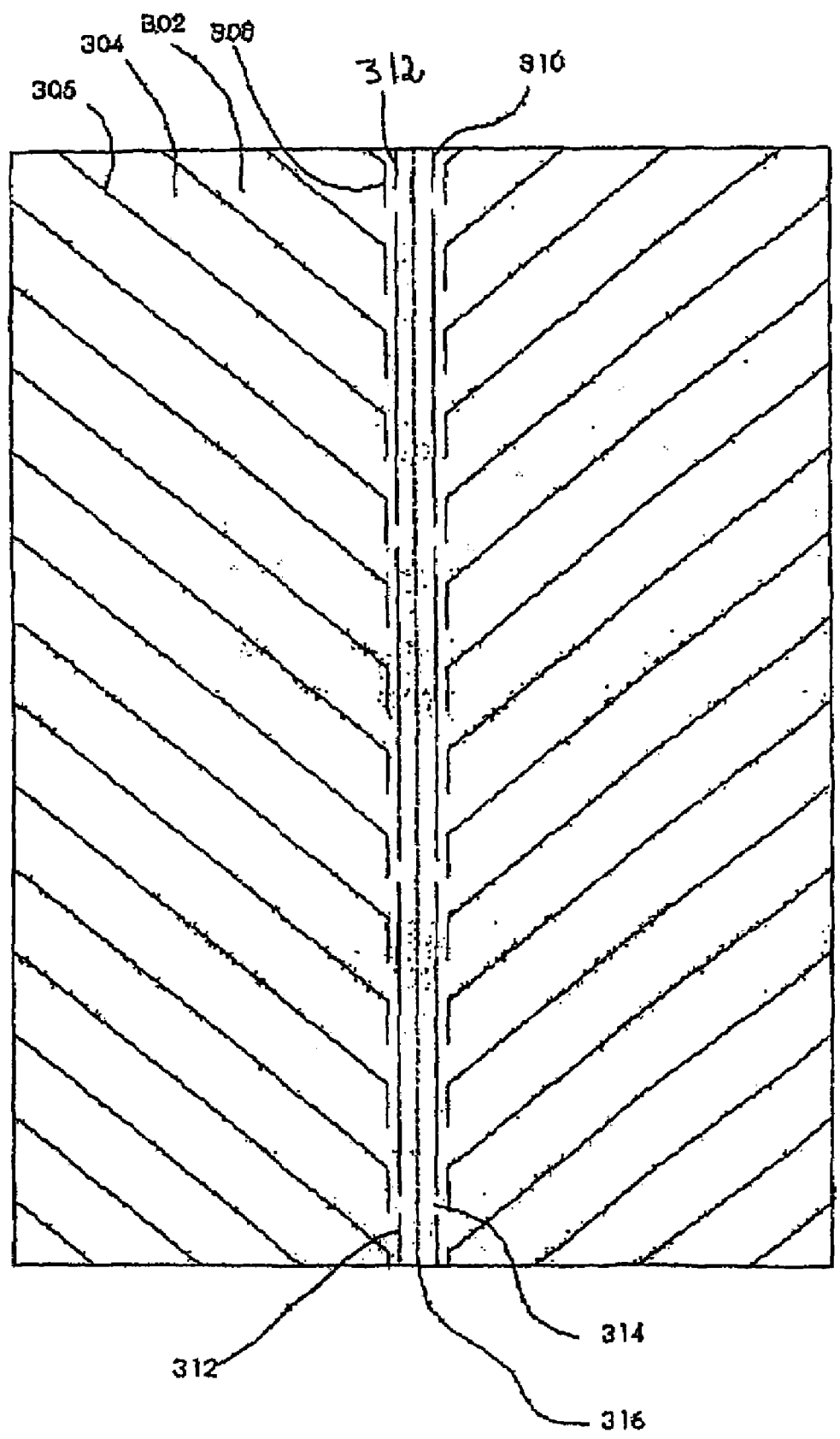
FIG. 3 is a pre-weld cellular cushioning material having a plurality of diagonally oriented, inflatable sleeves and a longitudinal weld, in accordance with a preferred embodiment of the present invention.

FIG. 3 illustrates the cellular cushioning material having a plurality of diagonally oriented, inflatable sleeves and a longitudinal weld, in accordance with the preferred embodiment of the present invention. In accordance with this embodiment of the present invention a pre-welded cellular cushioning material 300 is provided. Pre-welded cellular cushioning material 300 comprises diagonally welded sleeves 302, 304, 306 extending from the edges to the center of the plastic sheet allowing for the insertion of air during the process of manufacture of the cellular cushioning material. The air is inserted by the air inlet pipe 210 as shown in association with the device of FIG. 2. While the edge of the diagonal weld may terminate in a downward position 308 there is still left an opening to allow the inflating of the sleeves. In accordance with the present invention, the cellular cushioning material is also added with at least one additional weld 310 along the longitudinal path of the air inlet pipe entry line 316.

If the air inlet pipe line is located in the middle of the plastic sheet 300 then two longitudinal welds along the entire plastic sheet are added 310, 312. In order to enable the flow of air into the sleeves created by the diagonal lines small non-welded areas 314 along the horizontal path of the plastic sheets must be maintained.

In accordance with the present invention the diagonal welding forming the sleeves terminate around the mid section of the plastic sheet without connecting to the longitudinal lines 310, 312 along the span of the plastic sheet. When the air flows through the air inlet pipe 210 of FIG. 2 into the plastic sheet, the air flows from the internal channel 316 created by the longitudinal line through non-welded longitudinal line areas 314 to the sleeves created by the diagonal welded lines. In the preferred embodiment of the present invention the non-welded longitudinal line areas 314 are located about every 3 to 30 centimeters along the longitudinal axis of the plastic sheet and measure about 0.3 to 3 centimeters. The flow of air causes the inflation of the diagonal sleeves. Once the horizontal welding is applied to the plastic sheet by the bars 216, 214 of FIG. 2 the area having horizontal welding along the longitudinal path is sealed having air there within thus creating the inflated cellular cushioning material thus minimizing the unsealed areas with the exception of the non-welded horizontal line areas 314 and allowing for less non-inflated areas within the processed cellular cushioning material. The horizontal weld placed by bars 216, 214 is preferably applied to the plastic sheet about every 1 to 20 centimeter along the longitudinal axis of the plastic sheet.

The addition of the welded longitudinal lines along the air inlet pipe also allows for the diagonally lines to be created in various degrees in respect of the longitudinal welds. Thus, an obtuse angle (ranging in the about 110 degrees to the about 160 degrees) or an acute angle (ranging in the about 20 degrees to the about 70 degrees) than the diagonal angle shown in FIG. 3 can be used to create the plastic sheet. In addition, less diagonally oriented lines may be used thus creating larger sleeves and allowing greater speed in manufacturing the welded plastic sheet.

Figure 4:
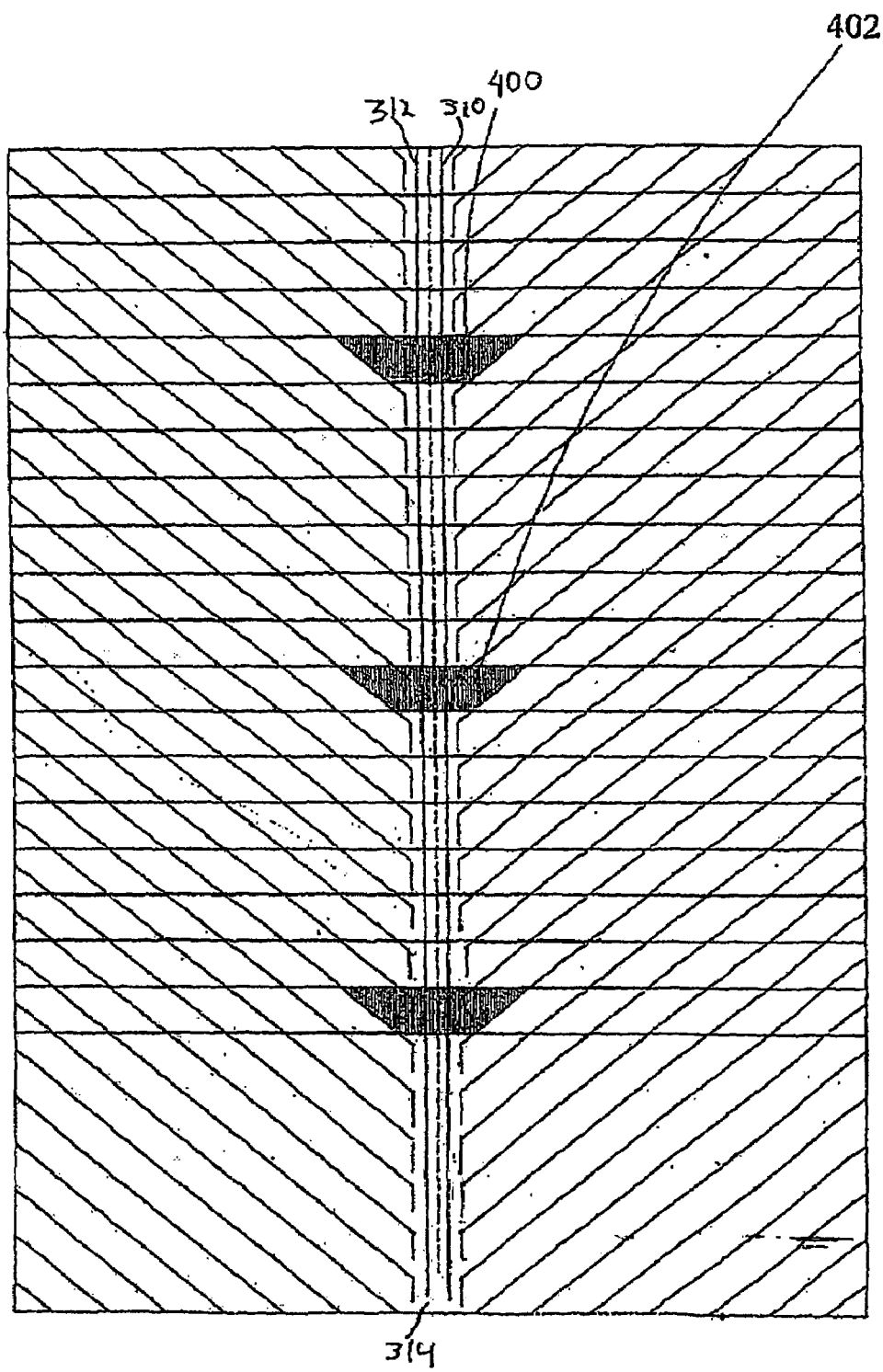
FIG. 4 is a cellular cushioning material having a plurality of diagonally oriented, inflatable sleeves having a horizontal and longitudinal welding, in accordance with the preferred embodiment of the present invention.

FIG. 4 shows a cellular cushioning material having a plurality of diagonally oriented, inflatable sleeves having a horizontal and longitudinal welding, in accordance with the preferred embodiment of the present invention. As seen in FIG. 4 areas 400, 402 are the only non-inflated areas along the plastic sheet. These areas are not inflated because of the remaining non-welded longitudinal line areas 314 of FIG. 3. It will be appreciated that the addition of longitudinal welded lines to plastic sheet 300 of FIG. 3 results in a cellular cushioning material having substantially less non-inflated areas along the mid section of the plastic sheet. Persons skilled in the art will appreciate that the same addition of welded horizontal line along the side of the plastic sheet, in such embodiments where the inlet pipe is inserted and operates at one side of the plastic sheet will likewise result in substantial less non-inflated areas along the plastic sheet.

Figure 5:
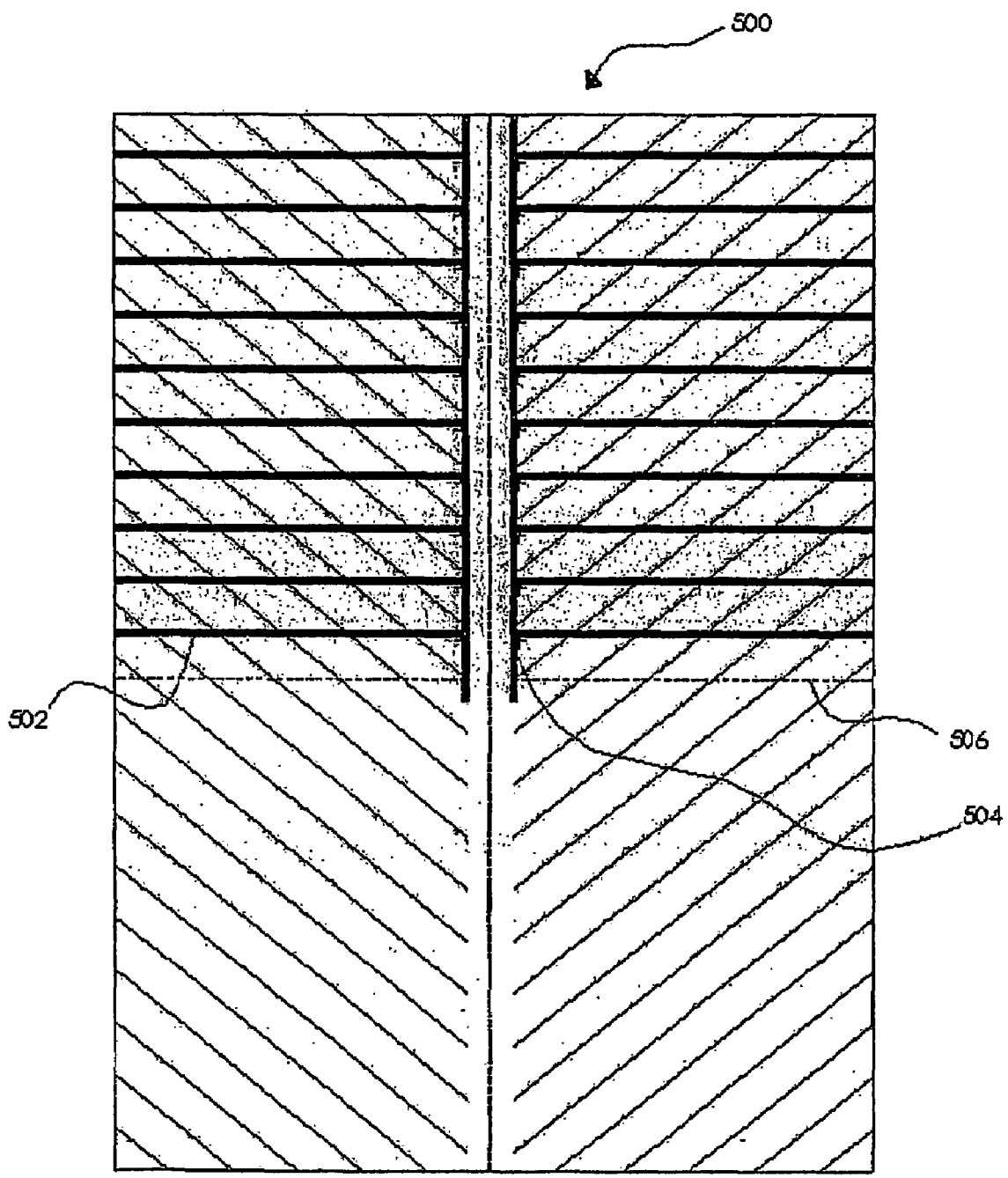
FIG. 5 is a cellular cushioning material having a plurality of diagonally oriented, inflatable sleeves having a horizontal welding added after air is injected into the inflatable sleeves, in accordance with another embodiment the present invention.

Reference is now made to FIG. 5 showing a cellular cushioning material having a plurality of diagonally oriented, inflatable sleeves having a longitudinal welding added after air is injected into the inflatable sleeves, in accordance with another embodiment the present invention. In accordance with this alternative embodiment of the present invention the welded longitudinal line is added to the plastic sheet during the process of manufacture of the cellular cushioning material. Plastic sheet 500 is a plastic sheet having pre-welded diagonal oriented lines creating sleeves along the length of the plastic sheet. In accordance with the present embodiment extensions of the diagonal welded lines need be performed downward to achieve maximum sealing. The plastic sealing bars 216, 217 of FIG. 2 is adapted such that an inverted or upside down L shaped weld (referred to below as L shaped) can be formed along the air inlet pipe path where the welded diagonal lines end in the middle section of the plastic sheet or at one end of the plastic sheet as the case may be.

Reference is made to FIG. 2B showing the L shaped plastic sealing bars showing an exemplary L shaped welding bars for the use in association with the device shown in FIG. 2 and for manufacturing the cellular cushioning material shown in FIG. 5. The L shaped welding bars 216, 214 create a horizontal weld 502 across the plastic sheet and a longitudinal weld 504 measuring at about the length of the next step where the next horizontal weld 506 is to be created by the plastic sealing system of FIG. 2. The length of the L shaped longitudinal line is dictated by the size of the L shaped downward or forward size of the bar performing the L welding. The same length should be equal to the advancing distance of the plastic sheet such as to form an overlapping seal along the length of the plastic sheet forming a completely sealed and inflated cellular cushioning material. The use of the L shaped longitudinal welding bar is advantageous in that it allows complete sealing of the plastic sheet, apart from the actual air inlet pipe path.

It will be appreciated by persons skilled in the art that the present invention is not limited to what has been particularly shown and described hereinabove. Rather the scope of the present invention is defined only by the claims, which follow.

I claim:

1. A longitudinal inflatable material configured to form an inflated cellular cushioning material in a continuous manner on an as-needed, real-time basis by continuously inflating said inflatable material and applying sealing lines across the width thereof every predetermined distance so as to form rows of closed inflated cells, the inflatable material comprising at least two layers of plastic joined together to form an inflatable sleeve and pre-welded to each other in a predetermined pattern, wherein said predetermined pattern comprises:

a plurality of diagonally oriented lines extending across the inflatable material so as to form a plurality of diagonally oriented inflatable sleeves of a predetermined width and a longitudinally extending air entry passage, wherein each of said inflatable sleeves has an opening at one end thereof for allowing entry of air from said air entry passage into said sleeve; and at least one discontinuous longitudinal line extending along said longitudinally extending air entry passage, said at least one discontinuous longitudinal line comprising a plurality of substantially longitudinal welded sections of a predetermined length interrupted by non-welded sections to allow passage of air from the air entry passage to the diagonally oriented inflatable sleeves;

wherein said predetermined length of said longitudinal welded sections is larger than said predetermined width of said inflatable sleeves so as to reduce the non-inflated areas along the air entry passage in the inflated cellular cushioning material.

2. The longitudinal inflatable material of claim 1 wherein each one of the two layers of plastic is made of one or more layers of plastic.

3. The longitudinal inflatable material of claim 1 wherein the plastic is a polymer based material.

4. The longitudinal inflatable material of claim 1 wherein the diagonally oriented lines form an obtuse angle with the longitudinal air entry passage.

5. The longitudinal inflatable material of claim 1 wherein the diagonally oriented lines form an acute angle with the longitudinal air entry passage.

6. The longitudinal inflatable material of claim 1 wherein said longitudinal air entry passage is located in a central region of said material and wherein said plurality of diagonally oriented lines comprise two sets of diagonal lines extending from opposite longitudinal sides of said material to said longitudinal air entry passage.

7. The longitudinal inflatable material of claim 1 wherein said longitudinal air entry passage is located along a longitudinal side of said material.

8. The longitudinal inflatable material of claim 1 wherein said predetermined distance between said sealing lines is of about 1 to about 20 centimeter.

9. The longitudinal inflatable material of claim 1 wherein the predetermined length of said longitudinal welded sections is of about 5 to about 30 centimeter.

10. The longitudinal inflatable material of claim 1 wherein said non-welded sections are of about 0.3 to about 3 centimeters.

* * * * *